Sept. 6, 1949. R. W. LUSK 2,480,866
SPLINE ALIGNING DEVICE FOR PROPELLERS OR THE LIKE
Filed Dec. 31, 1947 2 Sheets-Sheet 1
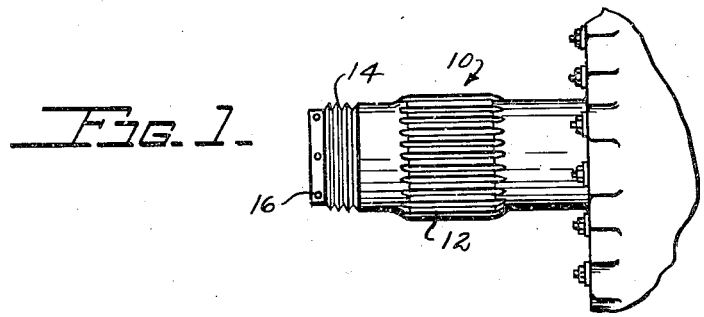
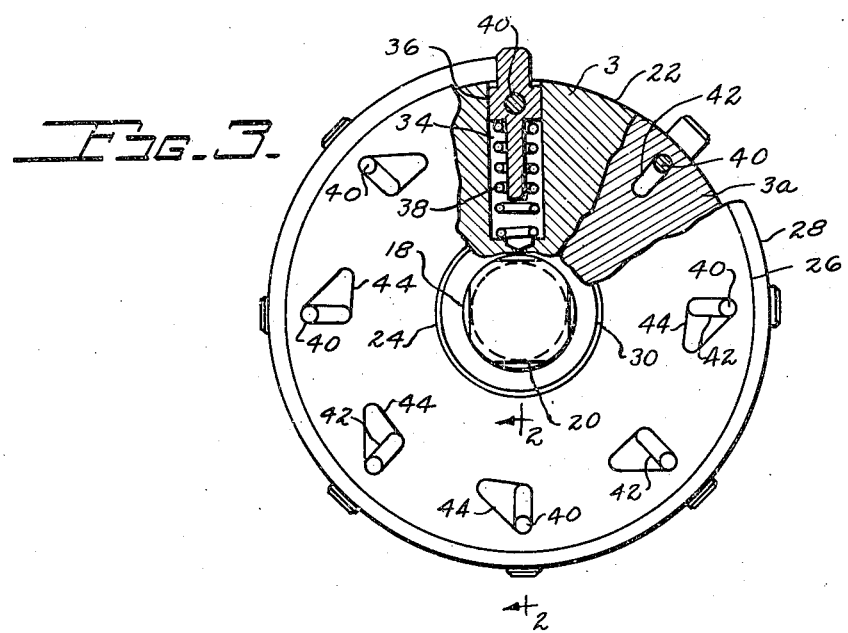
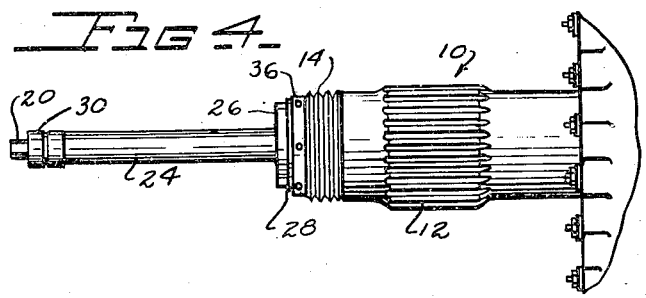
INVENTOR.
ROLLAND W. LUSK
BY Wade Koontz AND
Frederick W. Cotterman
ATTORNEYS Sept. 6, 1949.  R. W. LUSK  2,480,866
SPLINE ALIGNING DEVICE FOR PROPELLERS OR THE LIKE
Filed Dec. 31, 1947  2 Sheets-Sheet 2
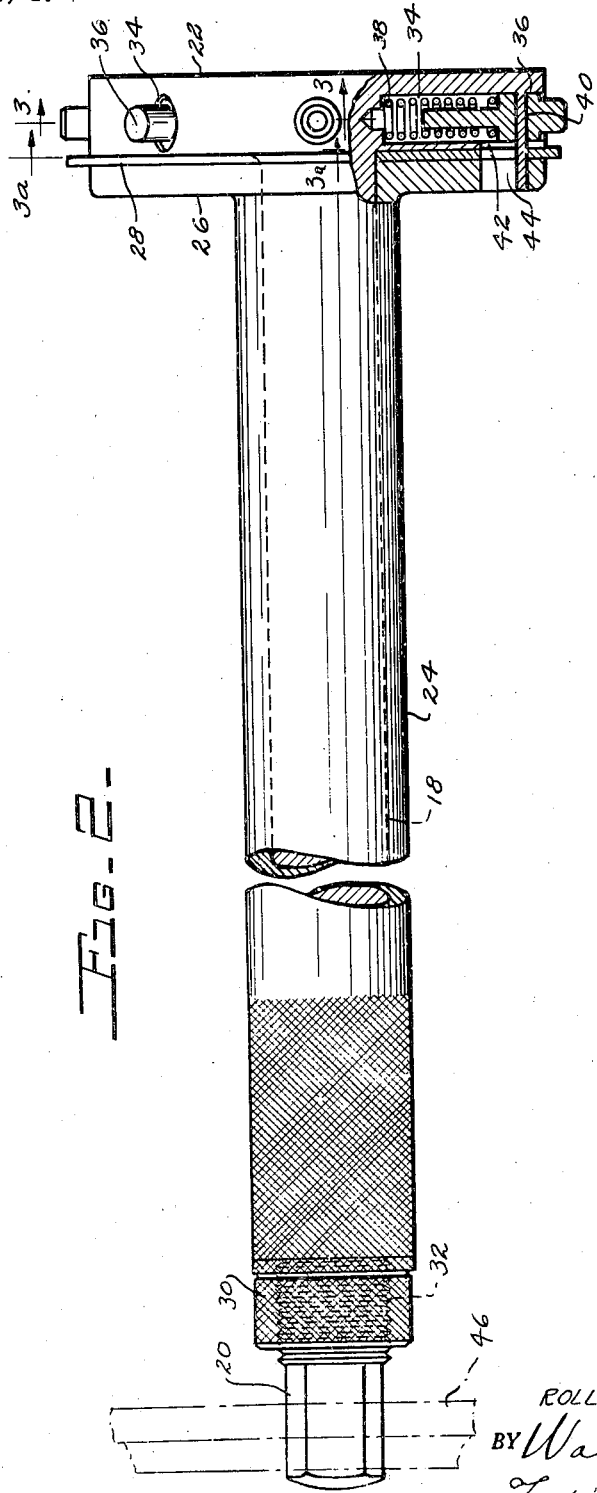
INVENTOR.
ROLLAND W. LUSK
BY Wade Koontz AND
Frederick W. Cotterman
ATTORNEYS Patented Sept. 6, 1949

2,480,866

UNITED STATES PATENT OFFICE 2,480,866

SPLINE ALIGNING DEVICE FOR PROPELLERS OR THE LIKE

Rolland W. Lusk, Dayton, Ohio

Application December 31, 1947, Serial No. 794,852

2 Claims. (Cl. 81—90)

(Granted under the act of March 3, 1883, as amended April 30, 1928; 370 O. G. 757)

The invention described herein may be manufactured and used by or for the Government for governmental purposes without payment to me of any royalty thereon.

This invention relates to a propeller assembling device and particularly to an assembling device for aligning the internal splines in a propeller hub with the external splines on the propeller shaft whereby the operation of assembling the hub on the shaft is expedited.

In assembling a propeller on a horizontally disposed propeller shaft the propeller is ordinarily suspended with its bore horizontal by means of a sling and hoist and when so suspended cannot without great difficulty be rotated on its axis to align its internal splines of the propeller hub with the external splines on the shaft.

Where an aircraft engine is mounted with its shaft at a slight angle with the horizontal the task of assembling the propeller is still more difficult. In either case, however, spline alignment is more readily accomplished by rotating the engine shaft.

Heretofore rotation of the propeller shaft to bring its splines into coincidence with those of the propeller hub was effected by means of a spanner wrench applied to one or more of the shaft splines with the consequent danger of injuring the splines.

It is therefore an object of this invention to provide a wrench which is in effect an extension of the engine shaft, and which includes means for quick attachment and removal, said means being automatically operative without danger of damage to any of the parts being assembled.

This and other objects and meritorious features are attained in the device hereinafter described, reference being had to the drawing, wherein:

Fig. 1 is a view of the nose of an aircraft engine with the propeller shaft projecting horizontally.

Fig. 2 is a side view of the tool itself as it appears before assembly with the propeller shaft, a portion being shown in axial section taken on the line 2—2 of Fig. 3.

Fig. 3 is a left-hand end view of the tool, a portion 3 being shown in transverse section taken on the line 3—3 of Fig. 2 and another portion 3a being shown in transverse section taken at 3a—3a of Fig. 2.

Fig. 4 is a view similar to Fig. 1 but with the improved assembly tool in place.

Like reference characters refer to like parts throughout the several views.

A tubular propeller shaft, to which the improved assembling tool herein disclosed is applicable, is shown at 10, Fig. 1, substantially in the position in which assembling of the propeller is usually effected. Propeller shaft 10 is provided with external splines 12 to which the internal splines of the propeller hub are slidably fitted, a threaded portion 14 for the propeller shaft nut and a series of radially extending openings 16 for receiving the locking means for the nut when it has been properly tightened.

The tool itself consists of a shaft 18 having a squared wrench engaging portion 20 at one end and a relatively thick flange 22 at the other. Freely rotatable on the shaft 18 is a tubular member 24 having a thinner flange 26 adjacent flange 22. A relatively thin disc 28 separates the two flanges, or, if desired, the disc 28 may be made integral with either the flange 22 or the flange 26. A nut 30 on a threaded portion 32 of the shaft 18 may be adjusted to limit end play between the two flanges.

Flange 22 is provided with a series of radial openings 34 into which plungers 36 are slidably fitted. Springs 38 in the openings 34 urge the plungers 36 radially outward. Pins 40 extend freely through oblong slots 42 in the flange 22 and transversely through the plungers 36 in which they are tightly secured. Slots 42 limit radially outward movement of the plungers 36 and prevent rotative movement of the plungers in their openings 34.

The outer ends of pins 40 extend through camming openings 44 in the thinner flange 26, whereby, when flange 26 is rotated relative to flange 22, the pins, and the plungers into which the pins extend are moved radially inward against the resistance of the springs 38 until they encounter the inner ends of slots 42. A wrench 46 having a square opening to fit the squared end of shaft 18 is provided for rotating the shaft. The tubular member 24 may preferably be knurled or otherwise roughened so that it may be turned manually with respect to the shaft 18 against the resistance of springs 38. Springs 38 may preferably be no stronger than required to overcome the friction of the plungers when they enter the openings 16 in the propeller shaft 10.

In using the improved assembling device herein shown and described the procedure may preferably be substantially as follows:

The plungers 36 are first withdrawn into their openings 34 in the flange 22 by relative rotation of the shaft 18 and tubular member 24, whereby the camming openings 44, acting on the pins 40, force the plungers radially inward against the resistance of the springs 38.

The flange 22 is next inserted in the bore of the propeller shaft 10 until restrained from further entry by the disc 28. The flange 22 is then rotated by means of the shaft 18 until the plungers drop into the openings 16 of the propeller shaft 10 as seen in Fig. 4. The propeller hub which is sling-suspended is then brought into alignment with the propeller shaft and pushed partway thereover. The wrench 46 is then applied to the squared end 20 of the shaft 18 and the propeller shaft 10 thereby rotated until the external splines on the propeller shaft may enter the internal splines of the propeller hub whereupon the hub may be slid fully into place and the assembling device removed by first withdrawing the plungers 36, preferably by rotation of the tubular member 24 on the shaft 18.

Having thus described an embodiment of my invention, I claim:

1. A tool for engaging and rotating a hollow propeller shaft having a series of radial locking holes near the forward end, which comprises a shaft, a flange on one end of said shaft and a polygonal wrench engaging portion on the other end, a tubular member rotatable on said shaft, a flange on one end of said tubular member adjacent to the first said flange, a nut on said shaft abutting the other end of said tubular member adjustable for limiting axial play of said tubular member on said shaft, a disc interposed between the two said flanges of larger diameter than said flanges, a series of radial plungers axially slidable in openings in the first said flange, springs in said openings urging said plungers radially outward, plunger operating pins parallel with the shaft axis and having the one end secured in transverse openings in the plungers and the other end extending through radial slots in the side of the first said flange, through said disc and into camming openings in the second said disc, the radial slots being formed to fit said pins closely to prevent rotation of said plungers in their openings and limit their radial movement, and said caming openings being formed to force said plungers radially inward against the resistance of said springs upon relative rotative movement between said tubular member and said shaft.

2. A tool for engaging and rotating a hollow propeller shaft having a series of radial locking openings near the forward end, which comprises a shaft, a flange on one end of said shaft and a wrench engaging portion on the other end, a member rotatable on said shaft, a flange on one end of said member adjacent to the first said flange, means on said shaft abutting the other end of said member for limiting axial play of said member on said shaft, stop means on one of said flanges of larger diameter than said flanges, a series of radial plungers axially slidable in openings in the first said flange positioned a preselected axial distance from said stop means, springs in said openings urging said plungers radially outward, plunger operating pins extending laterally from the plungers parallel with the shaft axis through radial slots in the side of the first said flange, and into camming openings in the second said flange, the radial slots being formed to fit said pins closely to prevent rotation of said plungers in their openings and limit their radial movement, and said camming openings being formed to force said plungers radially inward against the resistance of said springs upon relative rotative movement between said tubular member and said shaft.

ROLLAND W. LUSK.

REFERENCES CITED

The following references are of record in the file of this patent:

UNITED STATES PATENTS

| Number | Name | Date |
|---|---|---|
| 1,110,173 | Woodard | Sept. 8, 1914 |
| 1,565,227 | Garrison | Dec. 8, 1925 |
| 1,865,314 | Gruber | June 28, 1932 |

FOREIGN PATENTS

| Number | Country | Date |
|---|---|---|
| 8,927 | Great Britain | Apr. 16, 1913 |